US012025198B2

(12) United States Patent
Wang et al.

(10) Patent No.: US 12,025,198 B2
(45) Date of Patent: Jul. 2, 2024

(54) ANTIMONY FREE AND COPPER FREE CERAMIC FRICTION MATERIAL COMPOSITION

(71) Applicant: Robert Bosch GmbH, Stuttgart (DE)

(72) Inventors: Zhigang Wang, Willlowbrook, IL (US); Mark Phipps, Wayne, IL (US)

(73) Assignee: Robert Bosch GmbH, Stuttgart (DE)

( * ) Notice: Subject to any disclaimer, the term of this patent is extended or adjusted under 35 U.S.C. 154(b) by 592 days.

(21) Appl. No.: 17/217,426

(22) Filed: Mar. 30, 2021

(65) Prior Publication Data

US 2022/0316542 A1    Oct. 6, 2022

(51) Int. Cl.
*F16D 69/02* (2006.01)
*F16D 65/092* (2006.01)
*F16D 65/12* (2006.01)

(52) U.S. Cl.
CPC ......... *F16D 69/026* (2013.01); *F16D 65/092* (2013.01); *F16D 65/127* (2013.01); *F16D 2200/003* (2013.01); *F16D 2200/0065* (2013.01); *F16D 2200/0073* (2013.01)

(58) Field of Classification Search
CPC .... F16D 69/026; F16D 65/127; F16D 65/092; F16D 2200/0065; F16D 2200/0073; F16D 2200/003
See application file for complete search history.

(56) References Cited

U.S. PATENT DOCUMENTS

| 3,019,514 | A | 12/1959 | Bickelhaupt et al. |
| 3,684,062 | A | 8/1972 | Johnson |
| 5,041,471 | A | 8/1991 | Brinzey |
| 6,167,992 | B1 | 1/2001 | Torpey et al. |
| 6,220,404 | B1 | 4/2001 | Hara et al. |
| 8,962,711 | B2 | 2/2015 | Zhang |
| 9,404,546 | B2 | 8/2016 | Cox |
| 10,233,988 | B2 | 3/2019 | Kesavan et al. |
| 10,801,571 | B2 | 10/2020 | Kaji et al. |

(Continued)

FOREIGN PATENT DOCUMENTS

| IN | 201821036326 | 9/2018 |
| KR | 910000052 B1 | 1/1991 |

(Continued)

OTHER PUBLICATIONS

Korean Patent No. KR 101541885 to Jeong published on Aug. 6, 2015.*

(Continued)

*Primary Examiner* — Pamela Rodriguez
(74) *Attorney, Agent, or Firm* — Michael Best & Friedrich LLP

(57) ABSTRACT

Provided is a friction material that includes a boron-containing solid lubricant. The friction material may be used to form a brake pad for automotive vehicles. The friction material may include, by weight, about 1.0% to about 6.0% of the boron-containing solid lubricant, about 5.0% to about 15.0% of a fibrous or powdered metal material, an abrasive, an organic filler, an inorganic filler, and a binder. Advantageously, an antimony free and copper free friction material of the present disclosure may still achieve high friction performance and long pad life, providing a more environment friendly solution to brake systems.

17 Claims, 2 Drawing Sheets

(56) References Cited

U.S. PATENT DOCUMENTS

| | | |
|---|---|---|
| 2003/0175543 A1 | 9/2003 | Lo |
| 2006/0151268 A1 | 7/2006 | Kesavan et al. |
| 2010/0084232 A1 | 4/2010 | Subramanian |
| 2013/0037360 A1 | 2/2013 | Chen et al. |
| 2017/0022355 A1 | 1/2017 | Becquet et al. |
| 2017/0234390 A1 | 8/2017 | Kaji et al. |
| 2018/0291974 A1* | 10/2018 | Kesavan ............... F16D 69/026 |
| 2020/0032867 A1 | 1/2020 | Lee |
| 2020/0032869 A1 | 1/2020 | Kaji et al. |

FOREIGN PATENT DOCUMENTS

| | | |
|---|---|---|
| WO | 9502657 A1 | 1/1995 |
| WO | 2013048627 A1 | 4/2013 |
| WO | 2020023023 A1 | 1/2020 |

OTHER PUBLICATIONS

Grigoratos et al., "Non-exhaust traffic related emissions. Brake and tyre wear PM", European Commission JRC Science and Policy Reports, 2014, 53 pages.

Grigoratos et al., "Brake wear particle emissions: a review", Environ Sci Pollut Res, 2015, vol. 22, pp. 2491-2504.

Algan et al., "The Effect of metal fibers and borax powders on wear and friction performance of the organic based brake pads", Metallofiz. Noveishie Tekhnol., vol. 39, No. 11, 2017, pp. 1511-1523.

Jeganmohan et al., "Usage pf powder pinus brutia cone and colemanite combination in brake friction composite as a friction modifier", Materials Today, vol. 27, 2019, pp. 2072-2075.

Kumar et al., "Non-asbestos organic (NAO) friction composites: role of copper, its shape and amount", Wear vol. 270, 2011, pp. 269-280.

New Jersey Department of Health and Senior Services, Hazardous Substance Fact Sheet Antimony Trioxide, 2004, 6 pages.

Sugozu et al., "Investigation of the Effect on Tribological Properties of the use of Pinus Brutia Cone as a Binder in Brake Pads", European Mechanical Science, vol. 2, No. 4, 2018, pp. 115-118.

Sugozu et al., "The effect of Colemanite on the friction performance of automotive brake friction materials", Industrial Lubricant and Technology, vol. 68, No. 1, 2016, pp. 92-98.

Sugozu, "Effect of Nano boron on braking performance of composite brake pads", International Journal of Research in Engineering, vol. 1, Issue 4, 2019, pp. 9-13.

Uygunoglu et al., "Wear and friction of composites of an epoxy with boron containing wastes", Polimeroes, vol. 25, No. 3, 2015, pp. 271-276.

\* cited by examiner

ANTIMONY FREE AND COPPER FREE CERAMIC FRICTION MATERIAL COMPOSITION

BACKGROUND

Friction materials for the brake system of a motor vehicle have a significant impact on the vehicle's safety and operability. In addition to longevity, performance, and production cost, the environmental impact of the friction materials is also of great importance because of the release of such materials into the environment by wear during use as well as the vast number of vehicles in operation daily.

Traditionally, brake systems were made of asbestos-based friction materials. The debris produced from the wear of asbestos-based brake friction materials are hazardous to human due to their carcinogenic properties. Various non-asbestos organic (NAO) friction materials (also known as ceramic friction materials), including copper-based friction materials were developed. However, copper-based friction materials also lead to harmful emission of copper particulates into the environment (such as aquatic resources). Indeed, legislation in the United States (e.g., California SB 346 and Washington 6557-S.SL.) is expected to reduce/eliminate the use of copper in future brake compositions.

Antimony trisulfide is currently used as an efficient lubricant for automotive friction materials. However, the oxidation of antimony trisulfide produces antimony oxides containing both Sb(III) and Sb(V). The main oxidation product, antimony trioxide ($Sb_2O_3$), is regulated as a hazardous substance by OSHA and is cited by ACGIH, DOT, NIOSH, DEP, IARC, IRIS and EPA. Antimony trioxide may be a carcinogen in humans since it has been shown to cause lung cancer in animals.

Thus, there remains a need for alternative friction materials that offer both high performance and environment friendliness for wide use in brake systems.

SUMMARY

In an aspect, the present disclosure provides a friction material, comprising:
  about 1.0% to about 6.0% by weight of a boron-containing solid lubricant;
  about 5.0% to about 15.0% by weight of a fibrous or powdered metal material;
  an abrasive;
  an organic filler;
  an inorganic filler; and
  a binder.

In another aspect, the present disclosure provides a brake member for an automotive vehicle, comprising a substrate and the present friction material disposed over at least a region of the substrate. In another aspect, the present disclosure provides a brake assembly for an automotive vehicle, comprising a brake disk and a brake pad comprising the present friction material.

DETAILED DESCRIPTION

Figure 1A:
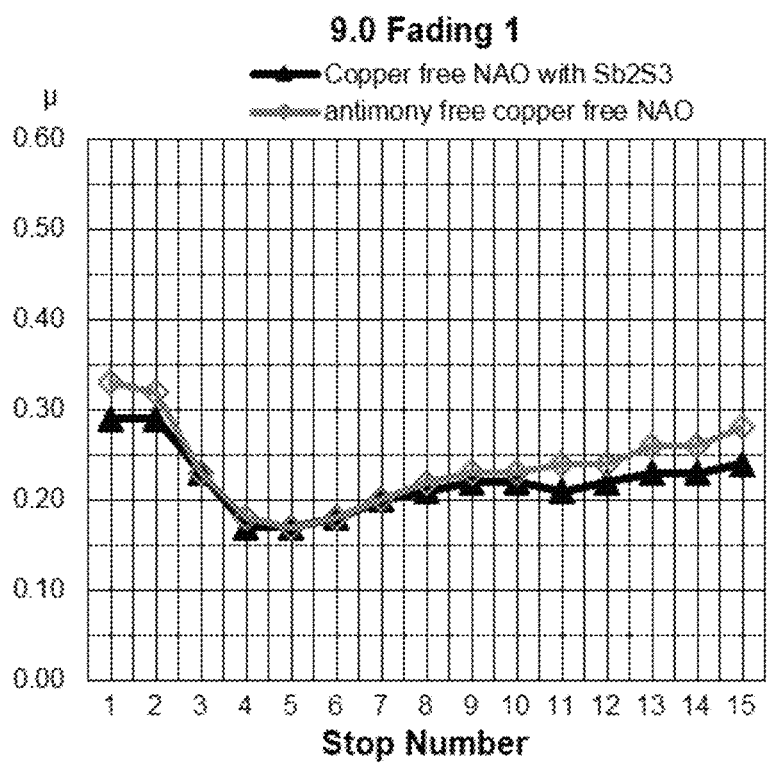
FIGS. 1A, 1B, and 1C show the representative results of first fading (Section 9.0), second fading (Section 14.0), and burnished friction levels (Section 2.0), respectively, in SAE J2522 standard performance tests. The calculated coefficient of friction ($\mu$) for a presently disclosed friction material ("antimony free copper free NAO") is compared to that of a comparative material containing antimony trisulfide ("Copper free NAO with $Sb_2S_3$").

The present disclosure provides a friction material suitable for use as a braking lining composition in automotive applications. The friction material includes boron-containing solid lubricants (such as colemanite or borax) and a fibrous or powdered metal material (such as aluminum fibers or powder). In particular embodiments, the present friction material is free of antimony, copper, molybdenum, chromium, or lead. Advantageously, the present disclosure provides an antimony free and copper free ceramic friction material.

Before any embodiments of the invention are explained in detail, it is to be understood that the invention is not limited in its application to the details of construction and the arrangement of components set forth in the following description. The invention is capable of other embodiments and of being practiced or of being carried out in various ways.

Unless otherwise defined, all technical and scientific terms used herein have the same meaning as commonly understood by one of ordinary skill in the art. In case of conflict, the present document, including definitions, will control. Suitable methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "comprising," "include(s)," "including," "having," "has," "contain(s)," "containing," and variants thereof, as used herein, are open-ended transitional phrases, terms, or words that are meant to encompass the items listed thereafter and equivalents thereof as well as additional items. The singular forms "a", "and", and "the" include plural references unless the context clearly dictates otherwise. Where the term "comprising" is used, the present disclosure also contemplates other embodiments "comprising," "consisting of," and "consisting essentially of," the embodiments or elements presented herein, whether explicitly set forth or not. Any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

Definitions of specific functional groups and chemical terms are described in more detail below. For purposes of this disclosure, the chemical elements are identified in accordance with the Periodic Table of the Elements, CAS version, Handbook of Chemistry and Physics, 75th Ed., inside cover, and specific functional groups are generally defined as described therein. Additionally, general principles of organic chemistry, as well as specific functional moieties and reactivity, are described in Organic Chemistry, Thomas Sorrell, University Science Books, Sausalito, 1999; Smith and March, March's Advanced Organic Chemistry, 5th Edition, John Wiley & Sons, Inc., New York, 2001; Larock, Comprehensive Organic Transformations, VCH Publishers, Inc., New York, 1989; Carruthers, Some Modern Methods of Organic Synthesis, 3rd Edition, Cambridge University Press, Cambridge, 1987; the entire contents of each of which are incorporated herein by reference.

The term "essentially free of" means that a composition contains a component in an amount of less than 0.5% by weight of the composition. This includes less than 0.4% by weight, less than 0.3% by weight, less than 0.2% by weight, less than 0.1% by weight, less than 0.05% by weight, or even less than 0.01% by weight. Compositions "essentially free of" a component also include a composition that is completely free of that component. As a non-limiting example, a composition is understood to be "essentially free" or "free" of a substance, where that substance is not added in the process of manufacturing the composition, but may be inevitably introduced in trace or undetectable amount via contamination or impurity of raw materials.

In one aspect, the invention provides a friction material, comprising:
  about 1.0% to about 6.0% by weight of a boron-containing solid lubricant;
  about 5.0% to about 15.0% by weight of a fibrous or powdered metal material;
  an abrasive;
  an organic filler;
  an inorganic filler; and
  a binder.

The boron-containing solid lubricant may include any boron-containing materials, such as borate minerals, that are thermally stable and maintain acceptable friction characteristics at high temperatures (e.g. 1000° C. or higher). Lubricants may be included as a powder or fine particles in the friction material in order to reduce wear during braking. Borate minerals include minerals which contain a borate anion group, such as $B_2O_5$, $B_3O_6$, $B_2O_4$ anions and more complex anions. Suitable borate minerals include, but are not limited to, colemanite or borax. The colemanite and borax materials as disclosed herein include the industrial materials from various sources known in the art under the name "colemanite" and "borax," respectively. In particular, colemanite includes a borate mineral having a formula of $Ca_2B_6O_{11} \cdot 5H_2O$ or $CaB_3O_4(OH)_3 \cdot H_2O$. Borax, also known as sodium borate, sodium tetraborate, or disodium tetraborate, includes a compound with formula $Na_2H_4B_4O_9 \cdot nH_2O$. Other borate minerals include kernite $Na_2B_4O_6(OH)_2 \cdot 3H_2O$, ulexite $NaCaB_5O_6(OH)_6 \cdot 5H_2O$, boracite $Mg_3B_7O_{13}Cl$, and painite $CaZrAl_9O_{15}(BO_3)$.

The friction material disclosed herein may comprise about 0.5% to about 10.0% by weight of a boron-containing solid lubricant. The friction material may comprise at least 1.0%, at least 2.0%, at least 3.0%, at least 4.0%, at least 5.0%, at least 6.0%, at least 7.0%, at least 8.0%, or at least 9.0% by weight of a boron-containing solid lubricant. The friction material may comprise 10.0% or less, 9.0% or less, 8.0% or less, 7.0% or less, 6.0% or less, 5.0% or less, 4.0% or less, 3.0% or less, 2.0% or less, or 1.0% or less by weight of a boron-containing solid lubricant. The friction material may comprise about 1.0% to about 8.0%, about 1.0% to about 6.0%, about 1.0% to about 5.0%, about 1.0% to about 4.0%, or about 2.0% to about 4.0% by weight of a boron-containing solid lubricant. In some embodiments, the friction material comprises from about 1.0% to about 6.0%, such as about 2.0% to about 4.0% by weight of a boron-containing solid lubricant. In some embodiments, the friction material comprises about 3.0%, about 4.0%, or about 5.0% by weight of a boron-containing solid lubricant. In particular embodiments, the friction material comprises about 1.0% to about 6.0% by weight of colemanite, or about 1.0% to about 5.0% by weight of borax.

The fibrous or powdered metal material as disclosed herein includes metal fibers, metal powders, metal alloy fibers, and metal alloy powders suitable for use in brake lining compositions. The fibrous or powdered metal material may be essentially free of iron. In some embodiments, the fibrous or powdered metal material includes one or more non-iron metal materials that are suitable for use in non-asbestos organic (NAO) friction materials. Suitable fibrous or powdered metal materials include, but are not limited to, aluminum fiber, aluminum powder, aluminum-magnesium alloy fiber, tin powder, and zinc powder.

The friction material disclosed herein may comprise about 2.0% to about 20.0% by weight of a fibrous or powdered metal material. The friction material may comprise at least 2.0%, at least 4.0%, at least 6.0%, at least 8.0%, at least 10.0%, at least 12.0%, at least 14.0%, at least 16.0%, or at least 18.0% by weight of a fibrous or powdered metal material. The friction material may comprise 19.0% or less, 17.0% or less, 15.0% or less, 13.0% or less, 11.0% or less, 9.0% or less, 7.0% or less, 5.0% or less, or 3.0% or less by weight of a fibrous or powdered metal material. The friction material may comprise about 2.0% to about 15.0%, about 5.0% to about 15.0%, about 5.0% to about 13.0%, about 5.0% to about 10.0%, or about 5.0% to about 8.0% by weight of a fibrous or powdered metal material. In some embodiments, the friction material comprises from about 5.0% to about 15.0%, such as about 5.0% to about 10.0% by weight of a fibrous or powdered metal material. In some embodiments, the friction material comprises about 6.0%, about 8.0%, about 10.0%, about 12%, or about 14.0% by weight of a fibrous or powdered metal material. In particular embodiments, the friction material comprises about 5.0% to about 10.0% by weight of aluminum fiber, aluminum powder, or aluminum-magnesium alloy fiber. In particular embodiments, the friction material comprises about 8.0% to about 15.0% by weight of tin powder, or about 5.0% to about 8.0% by weight of zinc powder.

The abrasive as disclosed herein may be classified according to the Mohs hardness scale. The abrasive may be in a particle form, and combinations of different types of materials may be used. Suitable abrasives include, but are not limited to, alumina, magnesium oxide, zircon flour, zirconia, zirconium silicate, silica, silicon dioxide, sand, silicon carbide, mullite, mica, ceramic fibers, calcium magnesium silicate, calcium zirconium silicate, calcium magnesium aluminum silicate, magnesium aluminum silicate, and a combination thereof. Abrasives rated higher on the Mohs hardness scale may be included at lower concentrations than abrasives rated lower on the Mohs hardness scale.

The friction material disclosed herein may comprise about 8.0% to about 20.0% by weight of an abrasive. The friction material may comprise at least 8.0%, at least 10.0%, at least 12.0%, at least 14.0%, at least 16.0%, or at least 18.0% by weight of an abrasive. The friction material may comprise 19.0% or less, 17.0% or less, 15.0% or less, 13.0% or less, 11.0% or less, or 9.0% or less by weight of an abrasive. The friction material may comprise about 10.0% to about 18.0%, about 11.0% to about 17.0%, or about 12.0% to about 16.0% by weight of an abrasive. In some embodiments, the friction material comprises from about 11.0% to about 17.0% by weight of an abrasive. In particular embodiments, the friction material comprises about 12.0%, about 13.0%, about 14.0%, about 15.0%, about 16%, or about 17.0% by weight of an abrasive.

The organic fillers as disclosed herein may include, but are not limited to, melamine dust, polymerized cashew nut shell liquid (CNSL) dust, PAN fiber, acrylic fiber, aramid fiber, ground rubber particles, cellulose, and a combination thereof.

The friction material disclosed herein may comprise about 5.0% to about 25.0% by weight of an organic filler. The friction material may comprise at least 5.0%, at least 8.0%, at least 10.0%, at least 15.0%, or at least 20.0% by weight of an organic filler. The friction material may comprise 24.0% or less, 22.0% or less, 18.0% or less, 14.0% or less, or 10.0% or less by weight of an organic filler. In some embodiments, the friction material comprises about 5.0% to about 20.0%, or about 8.0% to about 18.0% by weight of an organic filler.

The inorganic fillers as disclosed herein may include, but are not limited to, barium sulfate, wollastonite, mineral wool fiber, talc, titanate, calcium carbonate, calcium fluoride, lime, coal, graphite, coke, activated carbon, extendospheres, vermiculite, and a combination thereof.

The friction material disclosed herein may comprise about 30.0% to about 65.0% by weight of an inorganic filler. The friction material may comprise at least 30.0%, at least 40.0%, at least 50.0%, or at least 60.0% by weight of an inorganic filler. The friction material may comprise 58.0% or less, 55.0% or less, 45.0% or less, or 35.0% or less by weight of an inorganic filler. In some embodiments, the friction material comprises about 30.0% to about 58.0% by weight of an inorganic filler.

The friction material disclosed herein may comprise an organic filler and an inorganic filler in a total amount of about 50.0% to about 77.0%, or about 60.0% to about 70.0% by weight. For example, the friction material may comprise an organic filler and an inorganic filler in a total amount of about 60.0%, about 65.0%, or about 70.0% by weight.

The friction material disclosed herein may also include a binder that forms other components in the friction material into a thermosetting matrix. The binder is used to develop a matrix that holds other components in the friction material together. In some embodiments, the binder molds the boron-containing solid lubricant, the fibrous or powdered metal material, the abrasive, the organic filler, and the inorganic filler into a thermosetting matrix. In some embodiments, the binder comprises phenol-formaldehyde resin. For example, the friction material including phenol-formaldehyde resin may form as a rigid heat resistant composite suitable for brake pads for automotive use.

The friction material disclosed herein may comprise about 5.0% to about 15.0% by weight of a binder. In some embodiments, the friction material comprises about 6.0% to about 12.0%, or about 6.0% to about 10.0% by weight of a binder. For example, the friction material comprises about 6.0%, about 8.0%, or about 10.0% by weight of a binder.

In some embodiments, the friction material comprises, by weight,
- about 1.0% to about 6.0% a boron-containing solid lubricant,
- about 5.0% to about 15.0% a fibrous or powdered metal material,
- about 11.0% to about 17.0% an abrasive,
- about 6.0% to about 12.0% a binder, and
- about 50.0% to about 77.0% a combination of an organic filler and an inorganic filler.

The friction material disclosed herein may be essentially free of copper. For example, the friction material may contain less than 0.5%, less than 0.4%, less than 0.3%, less than 0.2%, less than 0.1%, less than 0.05%, or even less than 0.01% by weight of copper. In some embodiments, the friction material is free of copper.

The friction material disclosed herein may be essentially free of antimony (such as antimony trisulfide). For example, the friction material may contain less than 0.5%, less than 0.4%, less than 0.3%, less than 0.2%, less than 0.1%, less than 0.05%, or even less than 0.01% by weight of antimony. In some embodiments, the friction material is free of antimony.

In some embodiments, the friction material is essentially free of both copper and antimony. In some embodiments, the friction material is free of both copper and antimony.

In some embodiments, an antimony free and copper free friction material is provided, which consists of, in a total of 100% by weight,
- about 1.0% to about 6.0% a boron-containing solid lubricant,
- about 5.0% to about 15.0% a fibrous or powdered metal material,
- about 11.0% to about 17.0% an abrasive,
- about 6.0% to about 12.0% a binder, and
- a remainder that consists of an organic filler and an inorganic filler.

In another aspect, the present disclosure provides a brake member for an automotive vehicle, comprising a substrate and the present friction material disposed over at least a region of the substrate. In another aspect, the present disclosure provides a brake assembly for an automotive vehicle, comprising a brake disk and a brake pad comprising the present friction material.

Brake assemblies are utilized in a wide variety of vehicles, such as cars, trucks, airplanes, bicycles, and motorcycles. For example, a brake pad assembly may include a pair of brake pads positioned on opposite sides of a rotating body such as a brake disk that rotates with a wheel. When actuated, such as by an actuator, a pushing member such as a caliper pinches the brake disk between the pair of brake pads to apply a compression force resulting in friction that slows rotation of the wheel.

A brake pad may include a pad of friction material lining as described herein attached to a backing plate. The backing plate may be a solid metal plate, and the friction material lining may be attached to the backing plate via rivets or high-temperature adhesives. The friction material is the portion of the braking assembly which converts a vehicle's kinetic energy into heat. Advantageously, the friction material described herein may withstand high temperatures without excessive wear.

In some embodiments, the brake member is a brake pad that includes a backing plate and a friction pad disposed on at least a region of the backing plate, wherein the friction pad is formed from the friction material disclosed herein. For example, the friction material may be disposed over at least a region of the backing plate of the brake pad in order to form a brake lining of the brake pad.

In some embodiments, the brake assembly includes a plurality of brake pads having the friction material as described herein. Advantageously, the region of the backing plate of the brake pads having the friction material is configured to engage with, for example, the brake disk of the brake assembly. In other words, at least a portion of the brake pad that would otherwise be in direct contact with the brake disk during braking is advantageously coated with the friction material.

The friction material disclosed herein may be formed into a pad or lining using known production processes. These processes generally include mixing (such as dry blending), molding, and curing (stabilization) steps. A hot molding process at temperatures between 150° C. and 200° C. may be used, depending upon the reactivity of the binder (resin), the pad size, etc. The pad or liner prepared from the present friction material can then be applied to the backing plate of an automotive vehicle via, for example, an adhesive, rivets, or any other customary procedure. In some embodiments, the pad of friction material is formed around a metal tang, and/or another element such as a friction material wear indicator.

While a friction material has been described above as being disposed or coated upon a backing plate of a brake pad, it should be understood that a friction material according to the present disclosure could be similarly applied to other surfaces. For example, the friction material can be disposed upon at least a region of a brake disk, brake drum, clutch plate, or any other surface that may be subject to abrasion during use. Additionally, while brake pads of an automotive vehicle have been described above, the friction material of the present disclosure is not limited to automotive vehicles, and can be applied to, for example, bicycles, motorcycles, airplanes, or other mechanism having brake assemblies or otherwise abraded surfaces.

The following non-limiting examples illustrate the compositions of the present disclosure and method of use thereof.

EXAMPLES

Examples of antimony free and copper free friction materials were prepared according to the following formulations. All values are expressed in weight percent (wt. %).

Example 1

| | |
|---|---|
| Al—Mg alloy fiber | 8% |
| Colemanite | 4% |
| Abrasive | 15% |
| Filler | 65% |
| Binder | 8% |

Example 2

| | |
|---|---|
| Aluminum fiber | 8% |
| Borax | 3% |
| Abrasive | 15% |

-continued

| | |
|---|---|
| Filler | 66% |
| Binder | 8% |

Example 3

| | |
|---|---|
| Tin powder | 13% |
| Colemanite | 4% |
| Abrasive | 16% |
| Filler | 59% |
| Binder | 8% |

Example 4

| | |
|---|---|
| Znic powder | 6% |
| Borax | 3% |
| Abrasive | 12% |
| Filler | 71% |
| Binder | 8% |

Typically, the boron-containing solid lubricant (colemanite or borax), the fibrous or powdered metal material, the abrasive, the organic filler, the inorganic filler are mixed into a dry mixture. Following the addition of the binder (phenol-formaldehyde), the mixture is molded into a thermosetting matrix using known methods.

The friction material produced herein is compared to a comparative copper free material containing antimony trisulfide in a U.S. City Traffic (USCT) test. A shown in Table 1, the presently disclosed friction material with boron-containing solid lubricant ("antimony free copper free NAO") has both longer pad life and less rotor wear than the conventional material ("copper free NAO with $Sb_2S_3$"). Remarkably, the present friction material achieves these advantages without the use of any hazardous antimony components.

TABLE 1

| | USCT test | | | |
|---|---|---|---|---|
| Friction Material | Calculated pad life (km) | Rotor Weight Loss (g) | Inner Pad Weight Loss (Post Day 1) (g) | Outer Pad Weight Loss (Post Day 1) (g) |
| Copper free NAO with $Sb_2S_3$ | 21000 | 2.9 | 4.1 | 3.7 |
| Antimony free copper free NAO | 32000 | 1.8 | 2.2 | 1.8 |

Further, during the first fading under J2522 test Section 9.0 (FIG. 1A, braking stops 1-2), the present friction material shows a noticeably higher coefficient of friction ($\mu$ of 0.32-0.34) than the comparative material containing antimony trisulfide during initial fade ($\mu$ of 0.29). The two materials show equivalent performance in a few subsequent brake applications (FIG. 1A, braking stops 3-9). However, the present friction material again maintains a higher friction ($\mu$ of 0.24-0.28) than the comparative material ($\mu$ of 0.22-0.24) in later brake applications (FIG. 1A, braking stops 10-15).

Figure 1B:
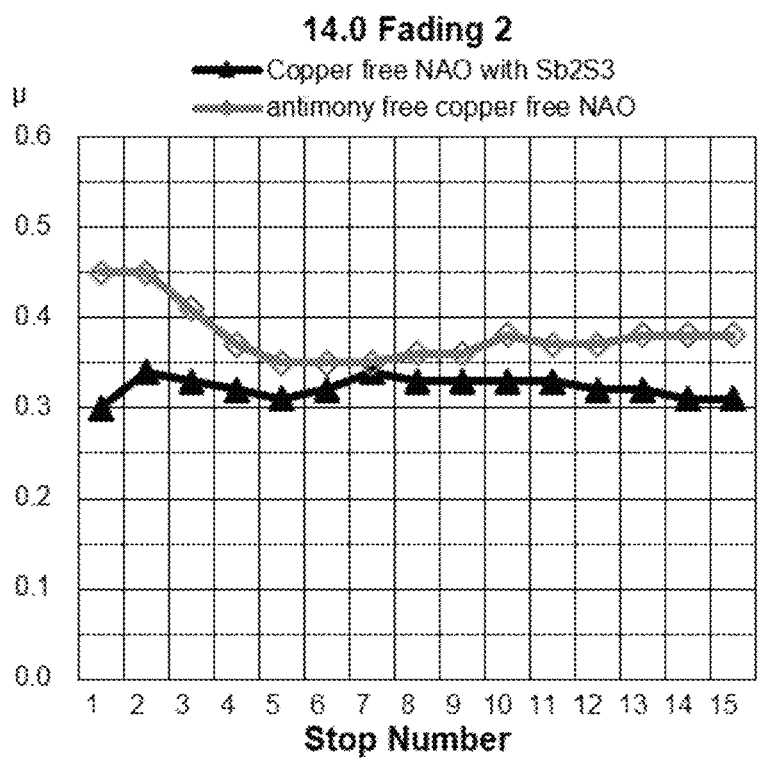

Further, during the second fading under J2522 test Section 14.0, the present antimony free copper free NAO friction material demonstrated better friction performance than the copper free NAO with $Sb_2S_3$ (FIG. 1B).

Figure 1C:
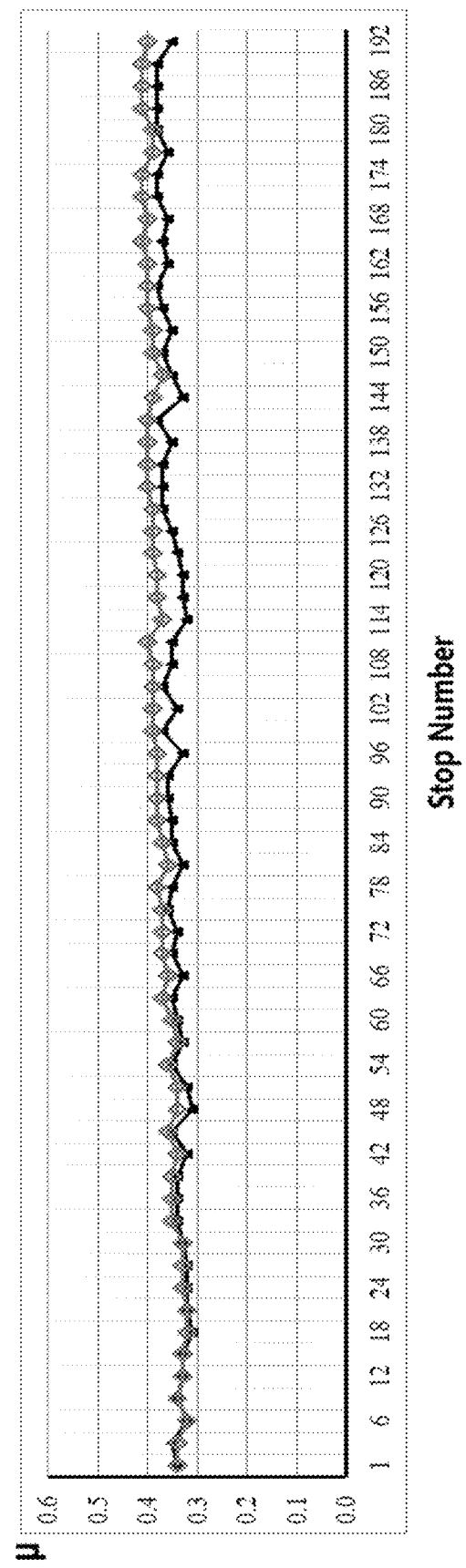

FIG. 1C illustrates burnished friction levels of the present friction material compared to a comparative copper free NAO friction material with $Sb_2S_3$ under SAE J2522. One method of mitigating the effects of initial fade is via scorching or burnishing. Burnishing is a method of pre-conditioning at least the top layers of the friction material by subjecting the friction material to bursts of mechanical force and/or heat prior to installation. Pre-conditioning can also be used to remove surface discontinuities in the surface of the friction material which can improve surface contact between the friction material and brake disk, and thus increase performance. As shown in FIG. 1C, the friction material described herein achieves a steady state μ of about 0.40, compared to the μ of about 0.35 of the comparative copper free NAO friction material with $Sb_2S_3$.

It is understood that the foregoing detailed description and accompanying examples are merely illustrative and are not to be taken as limitations upon the scope of the invention, which is defined solely by the following claims.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

What is claimed is:

1. A friction material, comprising:
    about 1.0% to about 5.0% by weight of a boron-containing solid lubricant;
    about 5.0% to about 15.0% by weight of a fibrous or powdered metal material;
    an abrasive;
    an organic filler;
    an inorganic filler; and
    a binder.

2. The friction material of claim 1, wherein the boron-containing solid lubricant comprises colemanite or borax.

3. The friction material of claim 1, wherein the fibrous or powdered metal material is selected from the group consisting of aluminum fiber, aluminum powder, aluminum-magnesium alloy fiber, tin powder, and zinc powder.

4. The friction material of claim 1, wherein the abrasive is selected from the group consisting of alumina, magnesium oxide, zircon flour, zirconia, zirconium silicate, silica, silicon dioxide, sand, silicon carbide, mullite, mica, ceramic fibers, calcium magnesium silicate, calcium zirconium silicate, calcium magnesium aluminum silicate, magnesium aluminum silicate, and a combination thereof.

5. The friction material of claim 1, comprising about 11.0% to about 17.0% by weight of the abrasive.

6. The friction material of claim 1, wherein the organic filler is selected from the group consisting of melamine dust, polymerized cashew nut shell liquid (CNSL) dust, PAN fiber, acrylic fiber, aramid fiber, ground rubber particles, cellulose, and a combination thereof.

7. The friction material of claim 1, comprising about 8.0% to about 18.0% by weight of the organic filler.

8. The friction material of claim 1, wherein the inorganic filler is selected from the group consisting of barium sulfate, wollastonite, mineral wool fiber, talc, titanate, calcium carbonate, calcium fluoride, lime, coal, graphite, coke, activated carbon, extendospheres, vermiculite, and a combination thereof.

9. The friction material of claim 1, comprising about 30.0% to about 58.0% by weight of the inorganic filler.

10. The friction material of claim 1, wherein the binder comprises phenol-formaldehyde resin.

11. The friction material of claim 1, comprising about 6.0% to about 12.0% by weight of the binder.

12. The friction material of claim 1, wherein the binder molds the boron-containing solid lubricant, the fibrous or powdered metal material, the abrasive, the organic filler, and the inorganic filler into a thermosetting matrix.

13. The friction material of claim 1, which is essentially free of copper.

14. The friction material of claim 1, which is essentially free of antimony.

15. A brake member for an automotive vehicle, comprising
    a substrate; and
    the friction material of claim 1 disposed over at least a region of the substrate.

16. A brake assembly for an automotive vehicle, comprising
    a brake disk; and
    a brake pad comprising the friction material of claim 1.

17. An antimony free and copper free friction material consisting of, in a total of 100% by weight,
    about 1.0% to about 5.0% a boron-containing solid lubricant,
    about 5.0% to about 15.0% a fibrous or powdered metal material,
    about 11.0% to about 17.0% an abrasive,
    about 6.0% to about 12.0% a binder, and
    a remainder that consists of an organic filler and an inorganic filler.

* * * * *